(12) United States Patent
Garner et al.

(10) Patent No.: US 9,807,924 B2
(45) Date of Patent: *Nov. 7, 2017

(54) SEEDING MACHINE WITH SEED DELIVERY SYSTEM

(71) Applicant: Deere & Company, Moline, IL (US)

(72) Inventors: Elijah B. Garner, Bettendorf, IA (US); Daniel B. Thiemke, Sun Prairie, WI (US); David J. Rylander, Victoria, IL (US); Nathan A. Mariman, Geneseo, IL (US); Michael E. Friestad, Rock Island, IL (US)

(73) Assignee: Deere & Company, Moline, IL (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/704,568

(22) Filed: May 5, 2015

(65) Prior Publication Data

US 2015/0230397 A1 Aug. 20, 2015

Related U.S. Application Data

(63) Continuation of application No. 14/504,801, filed on Oct. 2, 2014, which is a continuation of application No. 12/364,010, filed on Feb. 2, 2009, now Pat. No. 8,850,995.

(51) Int. Cl.
| | |
|---|---|
| *A01C 7/04* | (2006.01) |
| *A01C 7/12* | (2006.01) |
| *A01C 7/16* | (2006.01) |
| *A01C 7/20* | (2006.01) |
| *A01C 21/00* | (2006.01) |

(52) U.S. Cl.
CPC ............. *A01C 7/16* (2013.01); *A01C 7/125* (2013.01); *A01C 7/127* (2013.01); *A01C 21/00* (2013.01)

(58) Field of Classification Search
CPC .. A01C 7/04; A01C 7/00; A01C 7/046; A01C 7/044; A01C 7/042; A01C 7/125; A01C 7/123; A01C 7/12; A01C 7/08; A01C 7/16; A01C 7/166; A01C 7/20; A01C 21/00; A01C 7/127
USPC ..... 111/170–172, 177–185, 14, 11, 200, 900
See application file for complete search history.

(56) References Cited

U.S. PATENT DOCUMENTS

| | | |
|---|---|---|
| 2,141,044 A | 12/1938 | Rassman |
| 3,122,283 A | 2/1964 | Walters |
| 3,176,636 A | 4/1965 | Wilcox et al. |

(Continued)

FOREIGN PATENT DOCUMENTS

| | | |
|---|---|---|
| FR | 858062 A | 11/1940 |
| FR | 1026090 A | 4/1953 |

(Continued)

*Primary Examiner* — Christopher J Novosad
(74) *Attorney, Agent, or Firm* — Michael Best & Friedrich LLP

(57) ABSTRACT

A seeding machine with a seed meter and a seed delivery system for moving seed from a seed meter to a furrow formed in the soil. The delivery system has an endless member moving in a housing about pulleys to move seed from an upper opening in the housing to a lower discharge opening. In one embodiment, a loading wheel at the upper opening to the housing engages seed on a metering disk to move seed into the housing. The metering disk and housing can be arranged in planes parallel to one another.

20 Claims, 10 Drawing Sheets

(56) References Cited

U.S. PATENT DOCUMENTS

| | | |
|---|---|---|
| 3,343,507 A | 9/1967 | Smith |
| 3,552,601 A | 1/1971 | Hansen et al. |
| 3,913,503 A | 10/1975 | Becker |
| 4,193,523 A | 3/1980 | Koning |
| 4,600,122 A | 7/1986 | Lundie et al. |
| 4,646,941 A | 3/1987 | Grosse-Scharmann et al. |
| 5,533,458 A | 7/1996 | Bergland et al. |
| 5,936,234 A | 8/1999 | Thomas et al. |
| 6,237,514 B1 | 5/2001 | Romans |
| 6,651,570 B1 | 11/2003 | Thiemke |
| 6,681,706 B2 | 1/2004 | Sauder et al. |
| 7,185,596 B2 | 3/2007 | Thiemke et al. |
| 7,343,868 B2 | 3/2008 | Stephens et al. |
| 7,448,334 B2 | 11/2008 | Mariman et al. |
| 7,631,606 B2 | 12/2009 | Sauder et al. |
| 7,918,168 B2 | 4/2011 | Garner et al. |
| 8,074,586 B2 * | 12/2011 | Garner ................. A01C 7/105 111/171 |
| 8,468,960 B2 * | 6/2013 | Garner ................. A01C 7/20 111/171 |
| 8,671,856 B2 | 3/2014 | Garner et al. |
| 8,789,482 B2 * | 7/2014 | Garner ................. A01C 7/20 111/171 |
| 8,800,457 B2 | 8/2014 | Garner et al. |
| 8,813,663 B2 * | 8/2014 | Garner ................. A01C 7/20 111/171 |
| 8,850,995 B2 * | 10/2014 | Garner ................. A01C 7/20 111/11 |
| 2003/0159631 A1 * | 8/2003 | Sauder ................. A01C 7/04 111/171 |
| 2010/0300341 A1 | 12/2010 | Peterson et al. |

FOREIGN PATENT DOCUMENTS

| | | |
|---|---|---|
| FR | 2210887 A5 | 7/1974 |
| FR | 2414288 A1 | 8/1979 |
| FR | 2635432 A1 | 2/1990 |
| GB | 926217 A | 5/1963 |

* cited by examiner

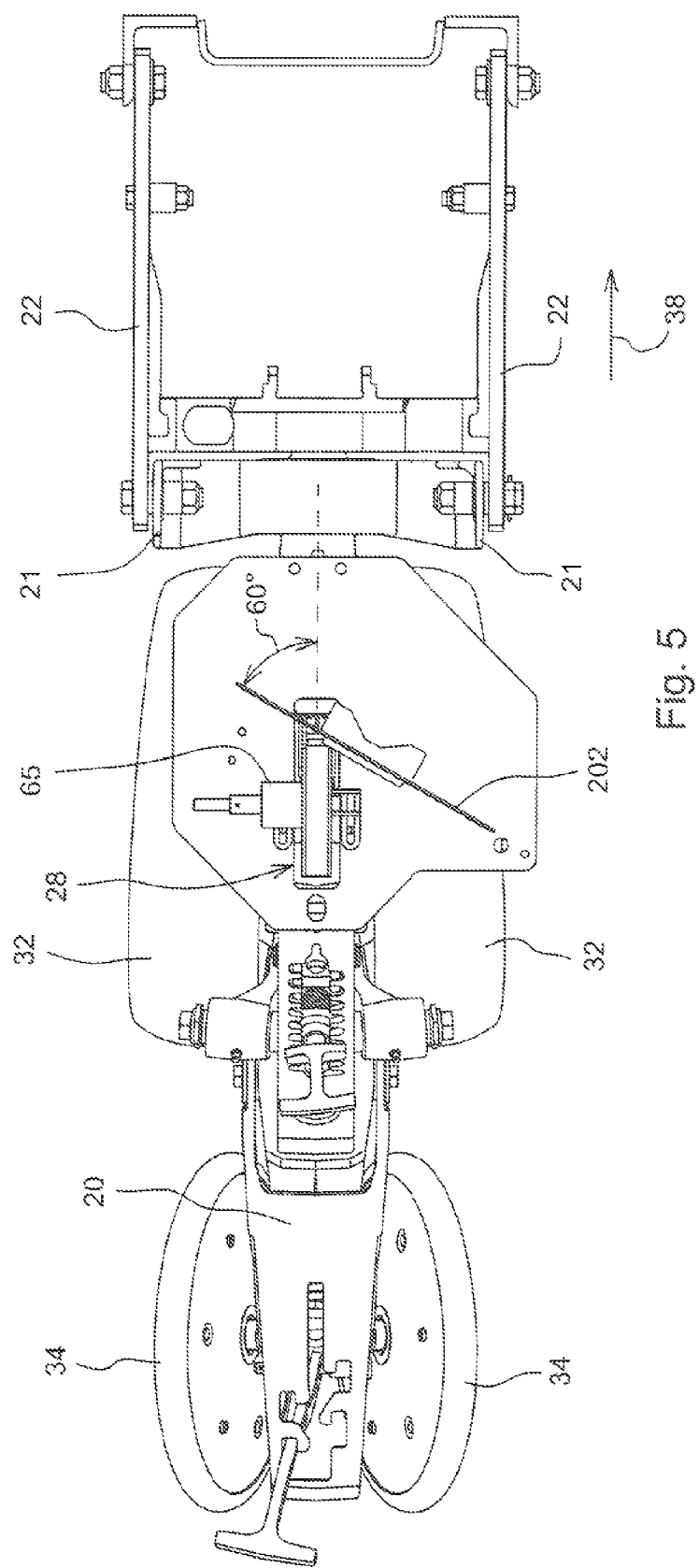

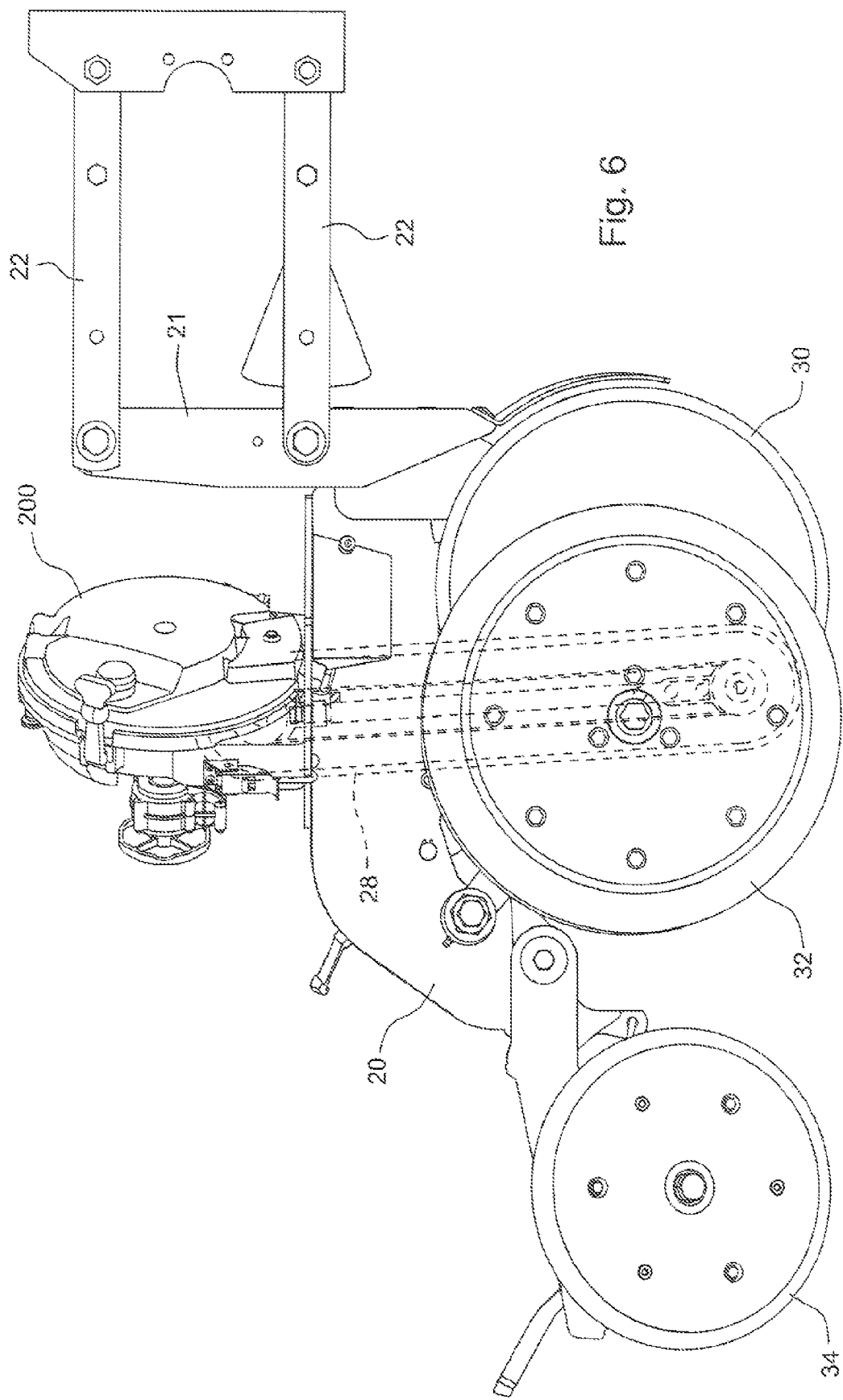

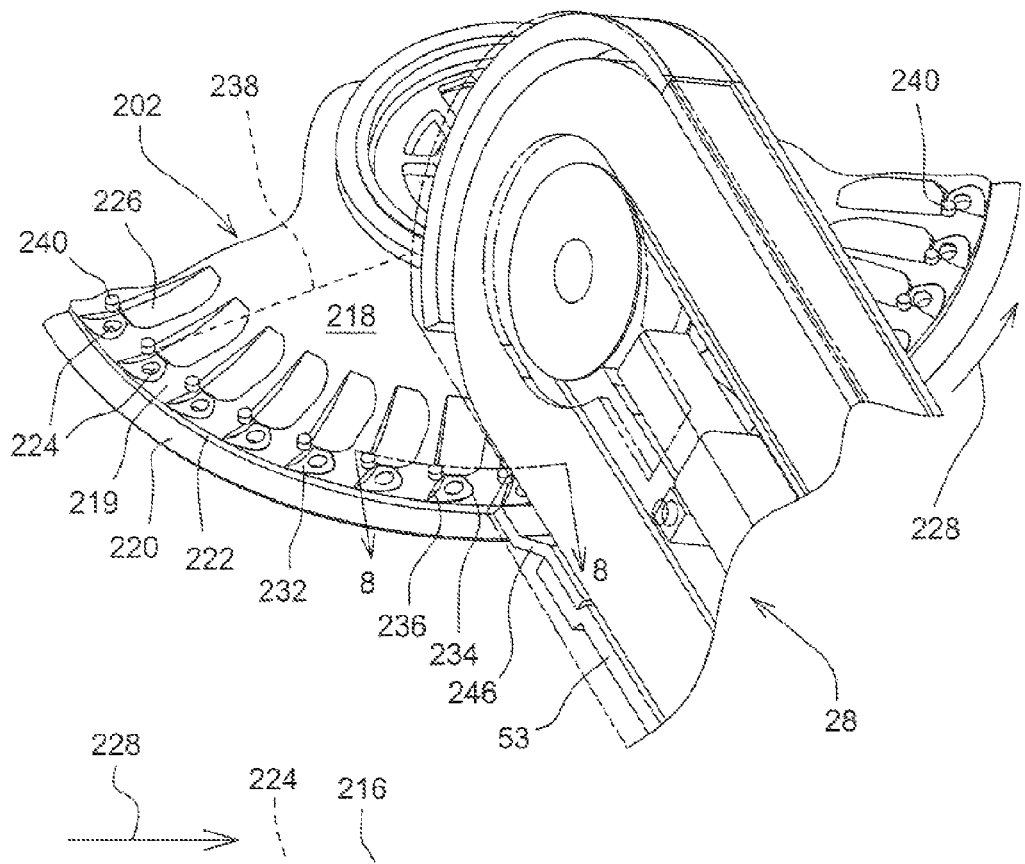
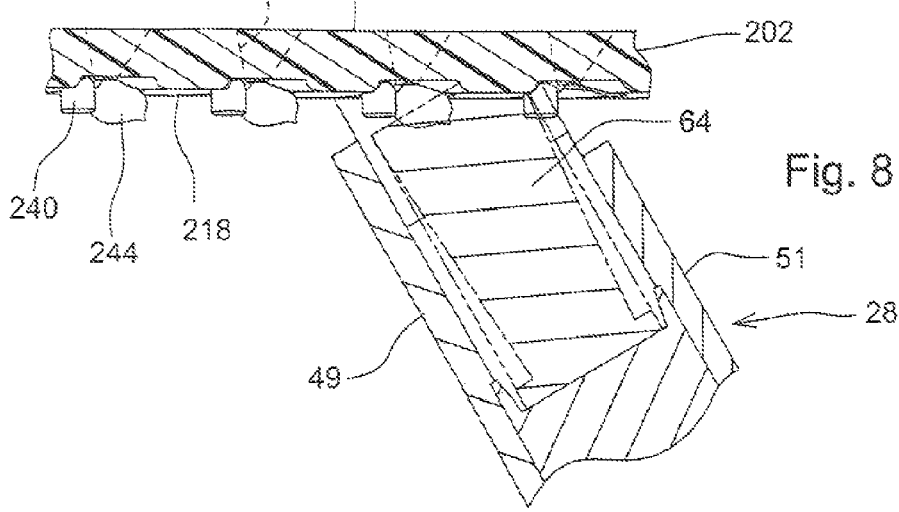

SEEDING MACHINE WITH SEED DELIVERY SYSTEM

CROSS REFERENCE TO RELATED APPLICATION

This application is a Continuation of U.S. patent application Ser. No. 14/504,801, filed Oct. 2, 2014, which is a Continuation of U.S. patent application Ser. No. 12/364,010, filed Feb. 2, 2009, now U.S. Pat. No. 8,850,995.

FIELD OF THE INVENTION

The invention relates to a seeding machine having a seed metering system and a seed delivery system for delivering seed from the meter to the ground.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like or powered by electric or hydraulic motors. Each row crop unit has a frame which is movably coupled with a tool bar. The frame may carry a main seed hopper, herbicide hopper and insecticide hopper. If a herbicide and insecticide are used, the metering mechanisms associated with dispensing the granular product into the seed trench are relatively simple. On the other hand, the mechanisms necessary to properly meter the seeds, and dispense the seeds at predetermined relative locations within the seed trench are relatively complicated.

The mechanisms associated with metering and placing the seeds generally can be divided into a seed metering system and a seed placement system which are in series communication with each other. The seed metering system receives the seeds in a bulk manner from the seed hopper carried by the planter frame or by the row unit. Different types of seed metering systems may be used, such as seed plates, finger plates, seed disks, etc. In the case of a seed disk metering system a seed disk is formed with a plurality of seed cells spaced about the periphery of the disk. Seeds are moved into the seed cells with one or more seeds in each seed cell depending upon the size and configuration of the seed cell. A vacuum or positive air pressure differential may be used in conjunction with the seed disk to assist in movement of the seeds into the seed cell. The seeds are singulated and discharged at a predetermined rate to the seed placement or delivery system.

The most common seed delivery system may be categorized as a gravity drop system. In the case of the gravity drop system, a seed tube has an inlet end which is positioned below the seed metering system. The singulated seeds from the seed metering system merely drop into the seed tube and fall via gravitational force from a discharge end thereof into the seed trench. The seed tube may have a rearward curvature to reduce bouncing of the seed as it strikes the bottom of the seed trench and to impart a horizontal velocity to the seed in order to reduce the relative velocity between the seed and the ground. Undesirable variation in resultant in-ground seed spacing can be attributed to differences in how individual seeds exit the metering system and drop through the seed tube. The spacing variation is exacerbated by higher travel speeds through the field which amplifies the dynamic field conditions. Further seed spacing variations are caused by the inherent relative velocity difference between the seeds and the soil as the seeding machine travels through a field. This relative velocity difference causes individual seeds to bounce and tumble in somewhat random patterns as each seed comes to rest in the trench.

Various attempts have been made to reduce the variation in seed spacing resulting from the gravity drop. U.S. Pat. No. 6,681,706 shows two approaches. One approach uses a belt with flights to transport the seeds from the meter to the ground while the other approach uses two belts to grip the seed and transport it from the meter to the ground. While these approaches control the seed path and reduce variability due to dynamic events, neither approach seeks to deliver the seed with as small as possible horizontal velocity difference relative to the ground. U.S. Pat. Nos. 6,651,570, 7,185,596 and 7,343,868 show a seed delivery system using a brush wheel near the ground to regulate the horizontal velocity and direction of the seed as it exits the seeding machine. However, there is still a gravity drop between the seed meter and the brush wheel which produces variation in seed spacing.

SUMMARY OF THE INVENTION

The present invention provides a seed delivery system that removes the seed from the seed meter by capturing the seed. The delivery system then moves the seed down to a lower discharge point and accelerates the seed rearward to a horizontal velocity approximately equal to the forward travel speed of the seeding machine such that the seed, when discharged, has a low or zero horizontal velocity relative to the ground. Rolling of the seed in the trench is reduced as a result of the near zero horizontal velocity relative to the ground. Furthermore, as the seed experiences a controlled descent from the point at which it is removed from the meter to a point very near the bottom of the trench, the system becomes nearly impervious to the field dynamics experienced by the row unit. The combination of controlled descent and discharge at a substantially zero horizontal speed relative to the ground reduces seed spacing variability.

BRIEF DESCRIPTION OF THE DRAWINGS

FIG. 5 is a top view similar to FIG. 4 illustrating the delivery system with the meter housing removed;

FIG. 6 is a side view of the row unit of FIG. 4;

FIG. 7 is a perspective view of the seed disk used in the seed meter shown in FIGS. 4-6;

FIG. 8 is a sectional view along the line 8-8 of FIG. 7 illustrating the orientation of the seed disk and brush or the seed delivery system of the present invention;

DESCRIPTION OF THE PREFERRED EMBODIMENT

Figure 1:
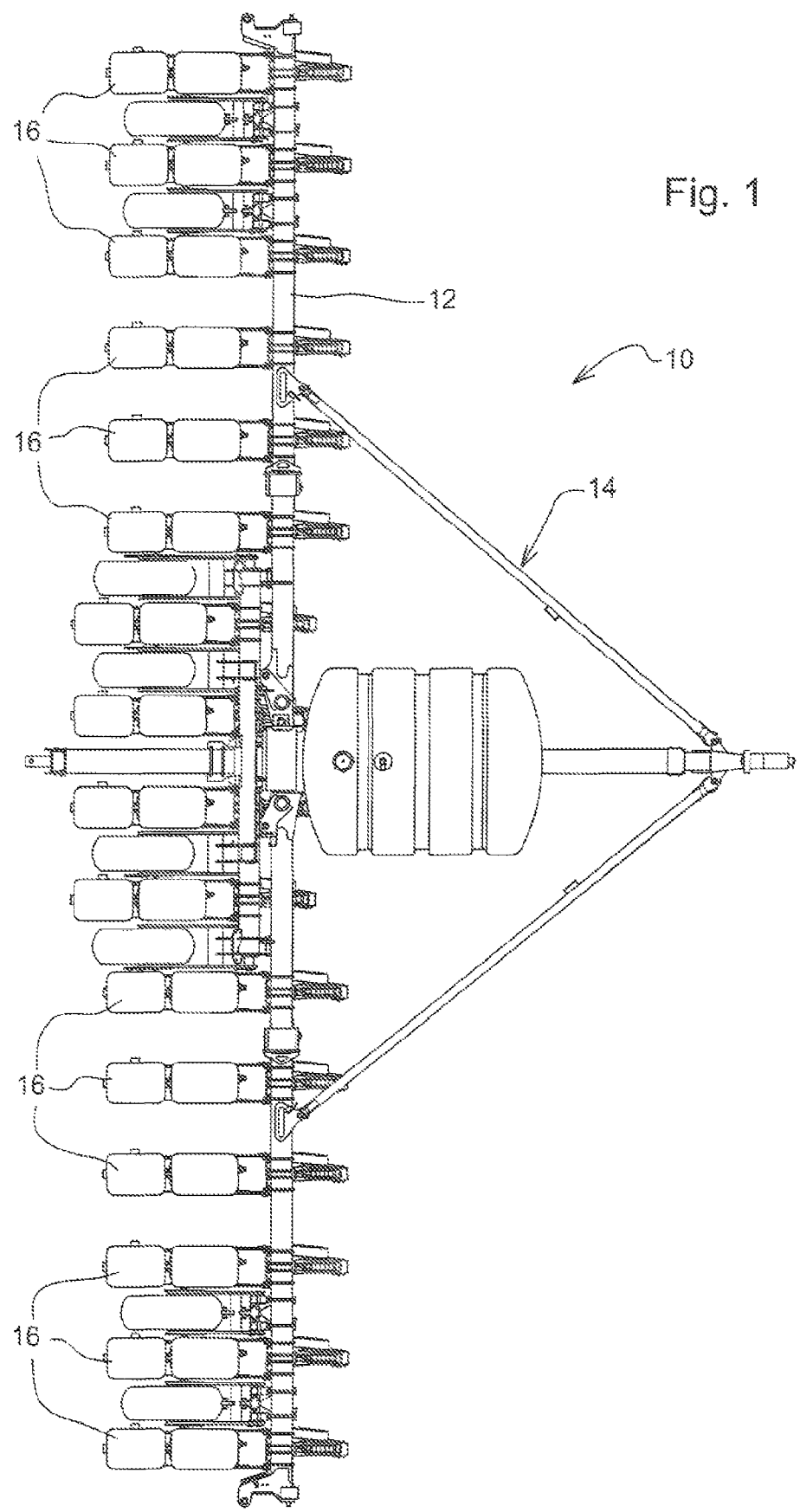
FIG. 1 is a plan view of a planter having the seed delivery system of the present invention.
Figure 2:
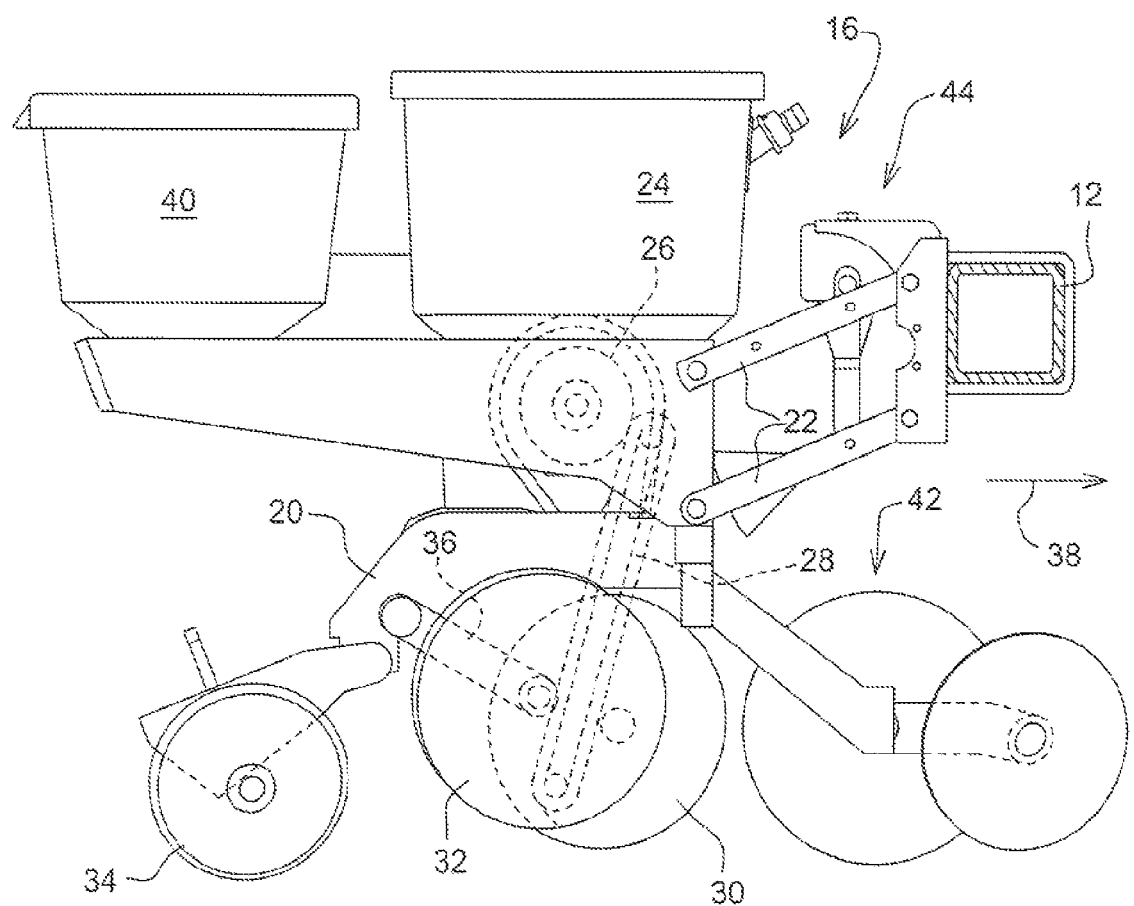
FIG. 2 is a side view of a row unit of the planter of FIG. 1.

With reference to FIG. 1 an example planter or seeding machine 10 is shown containing the seed delivery system of the present invention. Planter 10 includes a tool bar 12 as part of a planter frame 14. Mounted to the tool bar are multiple planting row units 16. Row units 16 are typically identical for a given planter but there may be differences. A row unit 16 is shown in greater detail in FIG. 2. The row unit 16 is provided with a central frame member 20 having a pair of upwardly extending arms 21 (FIG. 4) at the forward end thereof. The arms 21 connect to a parallelogram linkage 22 for mounting the row unit 16 to the tool bar 12 for up and down relative movement between the unit 16 and toolbar 12 in a known manner. Seed is stored in seed hopper 24 and provided to a seed meter 26. Seed meter 26 is of the type that uses a vacuum disk as are well known to meter the seed. Other types of meters can be used as well. From the seed meter 26 the seed is carried by a delivery system 28 into a planting furrow, or trench, formed in the soil by furrow openers 30. Gauge wheels 32 control the depth of the furrow. Closing wheels 34 close the furrow over the seed. The gauge wheels 32 are mounted to the frame member 20 by arms 36. The toolbar and row unit are designed to be moved over the ground in a forward working direction identified by the arrow 38.

The row unit 16 further includes a chemical hopper 40, a row cleaner attachment 42 and a down force generator 44. The row unit 16 is shown as an example of the environment in which the delivery system of the present invention is used. The present invention can be used in any of a variety of planting machine types such as, but not limited to, row crop planters, grain drills, air seeders, etc.

Figure 3:
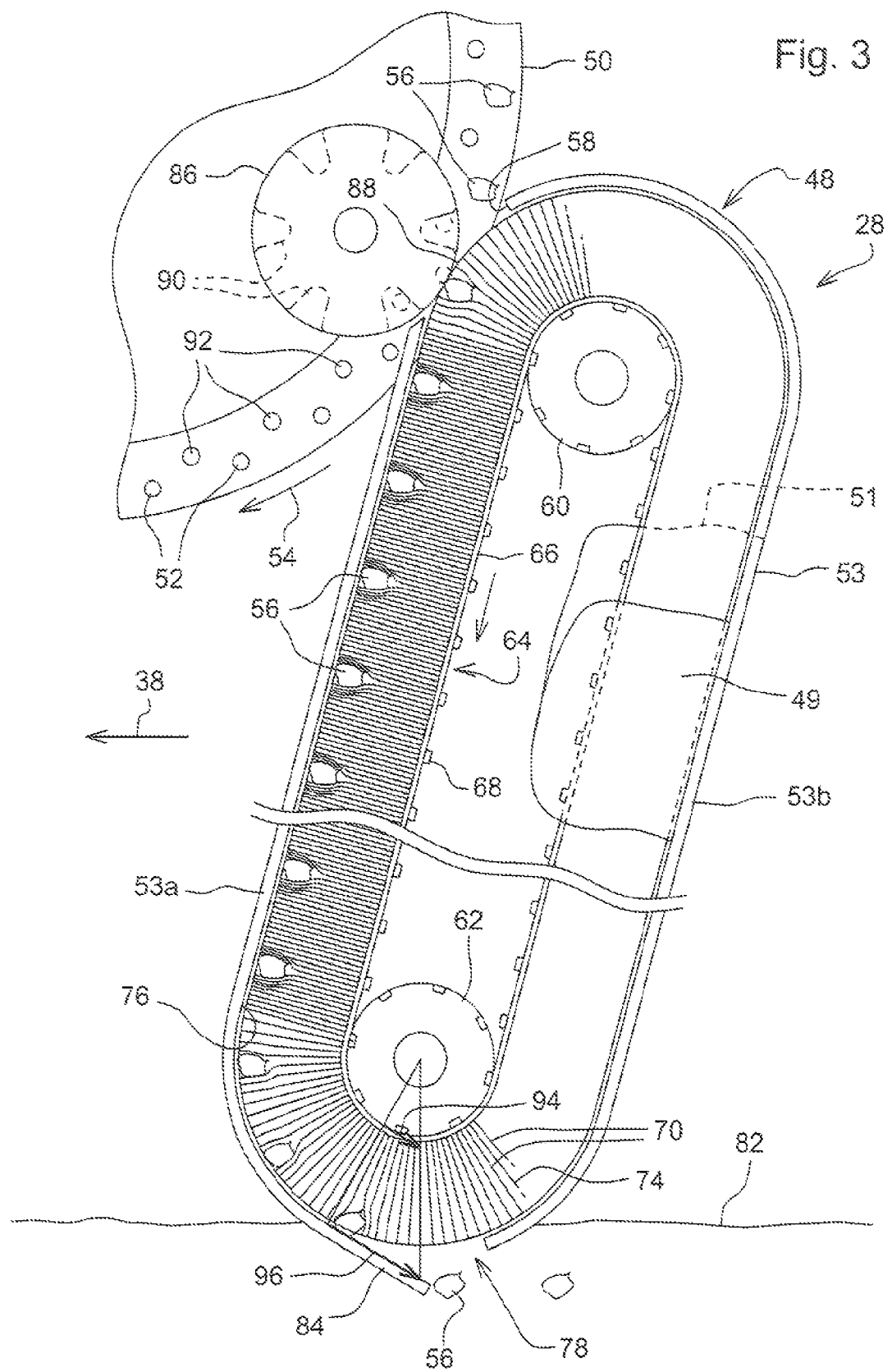
FIG. 3 is an enlarged side view of the seed delivery system of the present invention.

With reference to FIG. 3, the seed delivery system 28 is shown in greater detail. Delivery system 28 includes a housing 48 positioned adjacent the seed disk 50 of the seed meter. The seed disk 50 is a generally flat disk with a plurality of apertures 52 adjacent the periphery of the disk. Seeds 56 are collected on the apertures from a seed pool and adhere to the disk by air pressure differential on the opposite sides of the disk 50 in a known manner. The disk may have a flat surface at the apertures 52 or have seed cells surrounding the apertures 52. The disk rotates clockwise as viewed in FIG. 3 as shown by the arrow 54. At the top of FIG. 3, seeds 56 are shown adhered to the disk.

The seed delivery system housing 48 has spaced apart front and rear walls 49 and 51 and a side wall 53 therebetween. An upper opening 58 in the housing side wall 53 admits the seed from the metering disk 50 into the housing. A pair of pulleys 60, 62 are mounted inside the housing 48. The pulleys support a belt 64 for rotation within the housing. One of the pulleys is a drive pulley while the other is an idler pulley. The belt has a base member 66 to engage the pulleys and elongated bristles 70 extending therefrom, The bristles are joined to the base member at proximal, or radially inner, ends of the bristles. Distal, or radially outer, ends 74 of the bristles touch, or are close to touching, the inner surface 76 of the housing side wall 53. A lower housing opening 78 is formed in the side wall 53 and is positioned as close to the bottom 80 of the seed trench as possible. As shown, the lower opening 78 is near or below the soil surface 82 adjacent the trench. The housing side wall forms an exit ramp 84 at the lower opening 78.

Returning attention to the upper portion of FIG. 3, a loading wheel 86 is provided adjacent the upper opening 58. The loading wheel is positioned on the opposite side of the seeds 56 from the brush 64 such that the path of the seeds on the disk brings the seeds into a nip 88 formed between the loading wheel and the distal ends 74 of the bristles 70. At the location of the nip 88, the air pressure differential across the seed disk 50 is terminated, freeing the seed from the apertures 52 in the disk. The bottom surface of the loading wheel, facing the seed disk 50, has recesses 90 formed therein. The recesses 90 receive seed agitators 92 projecting from the seed disk 50. The moving agitators, by engagement with the recesses in the loading wheel, drive the loading wheel in a clockwise rotation.

In operation, the belt 64 is rotated in a counterclockwise direction. As the belt curves around the pulleys, the bristles will naturally open, that is, separate from one another as the distal ends of the bristles travel a larger circumferential distance around the pulleys than the inner ends of the bristle at the belt base member. This produces two beneficial effects as described below. The seeds are transferred from the seed meter to the delivery system as the seeds are brought by the disk into the nip 88. There the seeds are pinched off the seed disk between the loading wheel and the bristles 70 to remove the seed from the seed disk and seed meter. The seeds are captured or entrapped in the bristles by insertion of the seed into the bristles in a radial direction, that is from the ends of the bristles in a direction parallel to the bristle length. This occurs just as the belt path around the pulley 60 ends, when the bristle ends are closing back together upon themselves, allowing the bristles to close upon, and capture the seeds therein. As the belt continues to move, the bristles move or convey the seeds downward to the housing lower opening. The side wall 53 of the housing cooperates with the bristles 70 to hold the seed in the brush bristles as the seed is moved to the lower opening.

The lower opening 78 and the ramp 84 are positioned along the curved belt path around the pulley 62. The bristle distal ends thus cause the linear speed of the seeds to accelerate relative to the speed of the belt base member 66 and the housing as shown by the two arrows 94 and 96. The seeds are then propelled by the bristles over the ramp 84 and discharged through the lower opening 78 into the seed trench. The angle of the ramp 84 can be selected to produce the desired relationship between the seed vertical and horizontal speeds at discharge. The forward travel direction of the row unit is to the left in FIG. 3 as shown by the arrow 38. At the discharge, the horizontal speed of the seed relative to the ground is minimized to reduce roll of the seed in the trench.

The belt shown in FIG. 3 has relatively long bristles. As a result of the long bristles and the seed loading point being at the end of the curved path of the brush around the pulley 60 results in the seeds being loaded into the belt while the bristles have slowed down in speed. The bristle speed at loading is thus slower than the bristle speed at the discharge opening as the belt travels around the pulley 62. This allows in the seed to be loaded into the belt at a relatively lower speed while the seed is discharged at the lower end at a desired higher speed. As described above, it is preferred that the horizontal velocity of the seed at the discharge be equal to the forward travel speed of the planter but in the rearward direction such that the horizontal velocity of the seed relative to the ground is close to or equal to zero. The long bristles can be used to increase the speed of the seed as it travels around the pulley. However, a short bristle brush can be used as well. With a short bristle brush, there will be little acceleration in the speed of the seed as the seed travels around the pulleys. The belt will have to be driven at a speed to produce the desired horizontal velocity of the seed at the discharge. Even with a short bristle brush, the seed is still accelerated in the horizontal direction. As the belt travels around the pulley, the direction of travel of the seed changes from the predominantly vertical direction, when the seed is moved downward from the seed meter, to a predominantly horizontal direction at the discharge. This produces an acceleration of the seed velocity in the horizontal direction.

With the delivery system 28, the seed is captured by the delivery system to remove the seed from the seed meter. The seed is then moved by the delivery system to the seed discharge point where the seed is accelerated in a rearward horizontal direction relative to the housing. From the seed meter to the discharge, the seed travel is controlled by the delivery system, thus maintaining the seed spacing relative to one another.

In the embodiment shown in FIG. 3, the seed disk and the front and rear walls 49, 51 of the housing 48 lie in planes that are generally parallel one another. As shown, the plane of the delivery system is generally parallel to the direction of travel of the row unit. Other relationships between the seed meter and delivery system are shown and described below.

As shown in FIG. 3, the side wall 53 is divided by the upper and lower openings 58, 78 into two segments, 53*a* and 53*b*. Segment 53*a* is between the upper and lower openings in the direction of belt travel while the segment 53*b* is between the lower and upper openings in the direction of belt travel. It is the gaps in the side wall 53 that form the upper and lower openings. It should be understood, however, that the delivery system will function without the segment 53*b* of the side wall. It is only the segment 53*a* that functions together with the belt bristles to deliver the seed from the meter to the seed trench. Thus, the term "upper opening" shall be construed to mean a open area before the side wall segment 53*a* in the direction of belt travel and the term "lower opening" shall mean an open area after the side wall segment 53*a* in the direction of belt travel.

Figure 4:
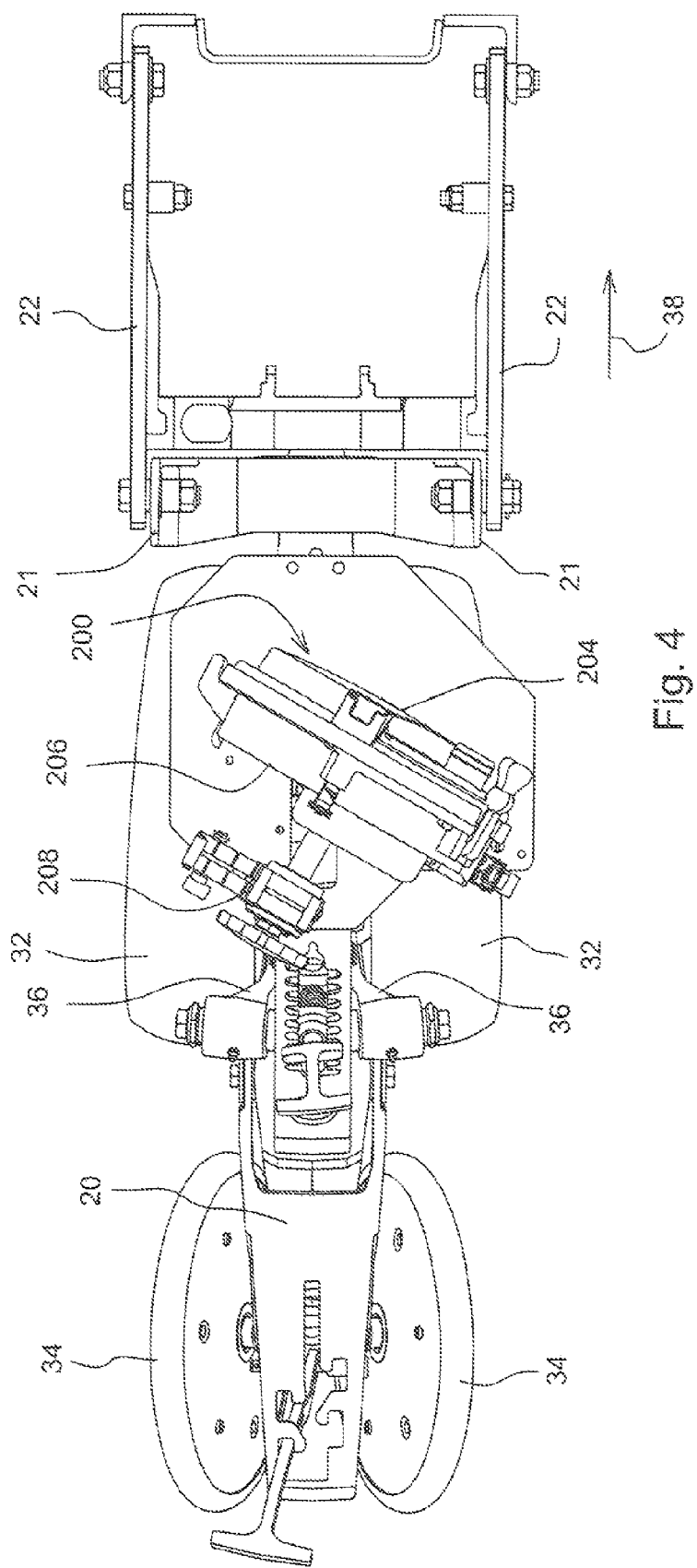
FIG. 4 is a top view of a planter row unit showing the metering system orientation in one alternative arrangement of the metering system and delivery system of the present invention.

With reference to FIGS. 4-7, the delivery system 28 is shown in combination with the seed meter and row unit structure in an alternative arrangement of the seed meter and delivery system 28. The seed meter 200 is shown mounted to the row unit with the seed disk 202 in a vertical orientation but at an angle to the forward travel direction shown by the arrow 38. FIG. 4 shows of the seed meter orientation in the row unit without the delivery system 28. The seed meter includes a housing having two halves 204 and 206 releasable joined together in a known manner. The seed meter is driven through a transmission 208 coupled to a drive cable, not shown.

In FIG. 5 only the seed disk 202 of the meter is shown with the seed delivery system 28. As previously mentioned, the seed disk 202 is in a vertical orientation but it does not lie in a plane parallel to the forward direction 38. Instead, the meter is oriented such that the disk is at a 60° angle relative to the forward direction when viewed from above. The seed of delivery system 28 is generally identical to that shown in FIG. 3 and is driven by a motor 65. The delivery system, including of the brush belt 64, is generally vertical and aligned with the fore and aft direction of the planter such that the angle between the brush and the seed disk is approximately 60°. The angle between the delivery system and a seed disk produces a partial "cross feed" of the seed into the brush. That is, the seed is fed into the brush at an angle to the lengthwise direction of the bristles. This is in contrast to FIG. 3 where the seed enters the brush in a direction substantially parallel to the lengthwise direction of the brush bristles. If the brush and seed disk were oriented at 90° to one another, a total cross feed would be produced with seed entering the brush perpendicular to the bristles.

The seed disk 202 is shown enlarged in FIGS. 7 and 8. The disk 202 has opposite sides, a vacuum side 216 and seed side 218. The seed side 218 has a surface 219 near the periphery that defines a reference plane. The reference plane will be used to describe the features of the disk near the disk periphery. An outer peripheral lip 220 is recessed from the reference plane. The peripheral lip 220 creates a radially outward edge face 222. A circumferential row of spaced apart apertures 224 is arranged around a circular path radially inward of the edge face 222. Each aperture extends through the disk between the vacuum side 216 and the seed side 218. Radially inward of each aperture 224, there is a radially elongated recess 226. The recess 226 is recessed axially into the disk from the reference plane. In operation, the disk rotates in a counterclockwise direction as indicated by the arrow 228. During rotation, the recesses 226 agitate the seed in the seed pool.

Surrounding each aperture 224 is a tapered recess, or shallow seed cell, 232 that extends axially into the disk from the reference plane. Seed cell 232 begins at a leading edge 234 in the direction of rotation of the disk and is progressively deeper into the seed side 218 to a trailing edge formed by an axially projecting wall 236. The tapered recess or seed cell 232 reduces the vacuum needed to pick-up and retain seed in the apertures 224. The seed cell also enables the seed to sit lower relative to the seed side 218 of the disk, allowing the seed to be retained while the seed singulator removes doubles or multiples of seed from the apertures 224. In addition, the recess wall 236 agitates seed in the seed pool, further aiding in seed pick-up. The wall 236 extends lengthwise in a predominately radial direction as shown by the dashed line 238. The walls 236, while predominately radial, are inclined to the radial direction such that the inner end of the wall 236 is leading the outer end of the wall in the direction of rotation. Immediately following each wall 236, as the disk rotates, is a projection, or upstanding peg 240 extending axially from the disk seed side. The pegs engage seed in the seed pool for agitation to aide in seed pick-up. The pegs 240 are located slightly radially inward of the circular path of apertures 224 to avoid interference with the seed singulator.

With reference to FIG. 8, the disk 202 is shown in operation and in position relative to the belt 64 in the delivery system 28. As seeds 244 are carried by the disk 202 into the bristles of the brush 64, the wall 236 and the pegs 240 act to push the seed 244 into the bristles of the brush 64 and assist in keeping the seed from being knocked off the disk upon the seed's initial contact with the brush bristles. Once the seed is inserted into the brush bristles, the vacuum from the opposite side of the disk is cut-off, allowing the brush to sweep the seed off the disk in a predominately radial direction relative to the disk. An insert 246 overlies the lip 220 at the point of seed release to hold the seed in the brush bristles in the transition between the disk and the side wall 53 (FIG. 3) of the delivery system housing. The disk 202 is inclined to the length of the brush bristles at approximately a 60 degree angle. This produces the partial cross-feed of the seed into the brush bristles.

Figure 9:
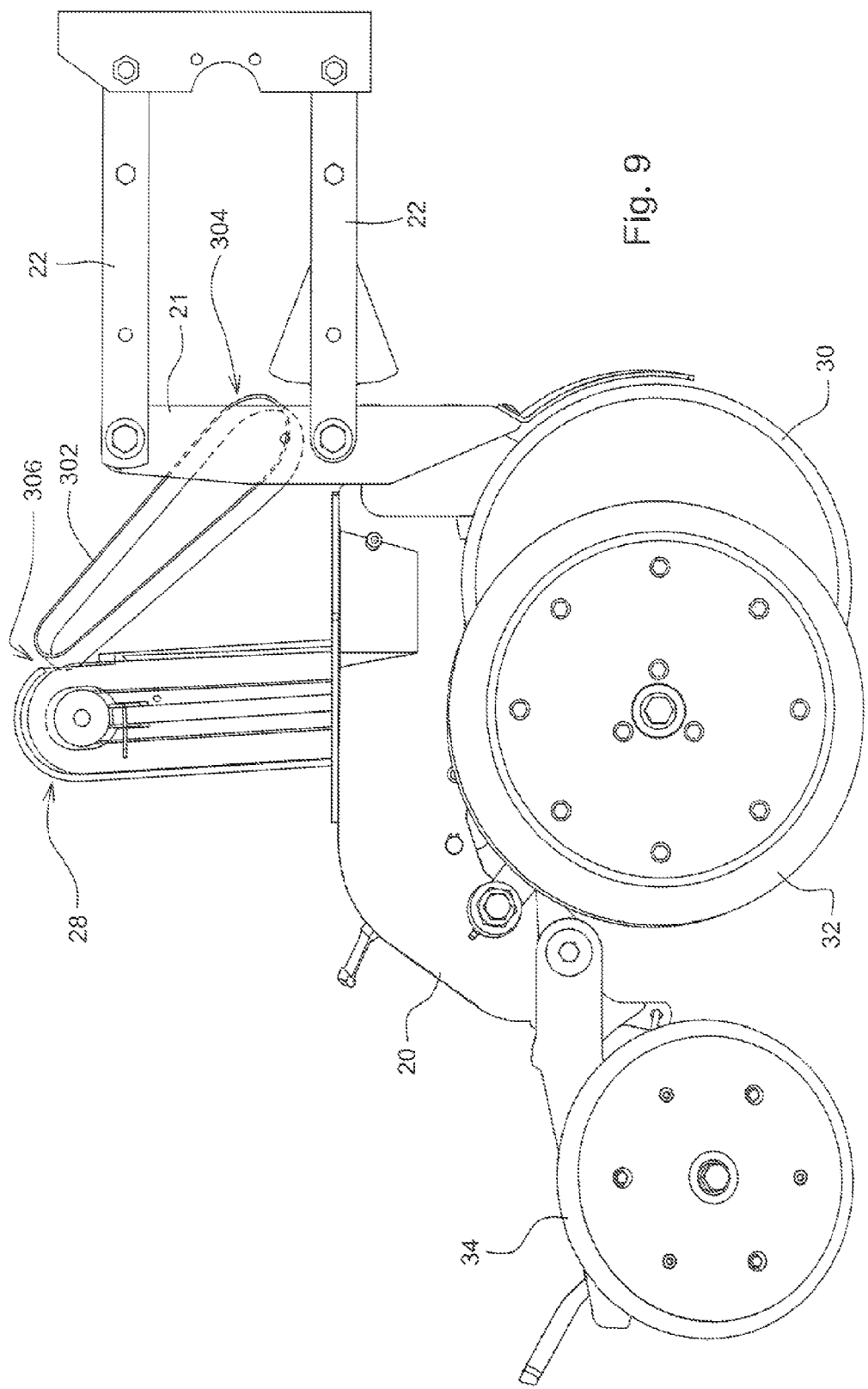
FIG. 9 is a side view of a row unit showing the orientation of the delivery system of the present invention and a vacuum belt seed meter.

FIG. 9 shows the brush belt seed delivery system 28 in combination with a vacuum belt metering system having a metering belt 302. The vacuum belt meter is fully described in U.S. Pat. No. 7,918,168 incorporated herein by reference. The belt 302 picks-up seed at a pick-up region 304 at a lower, front location of the belt's path and transports it to the delivery system at a release region 306 at an upper, rear location of the belt's path. In this arrangement of the belt meter and the brush delivery system, the delivery system is again partially cross fed with seeds from the meter.

Figure 10:
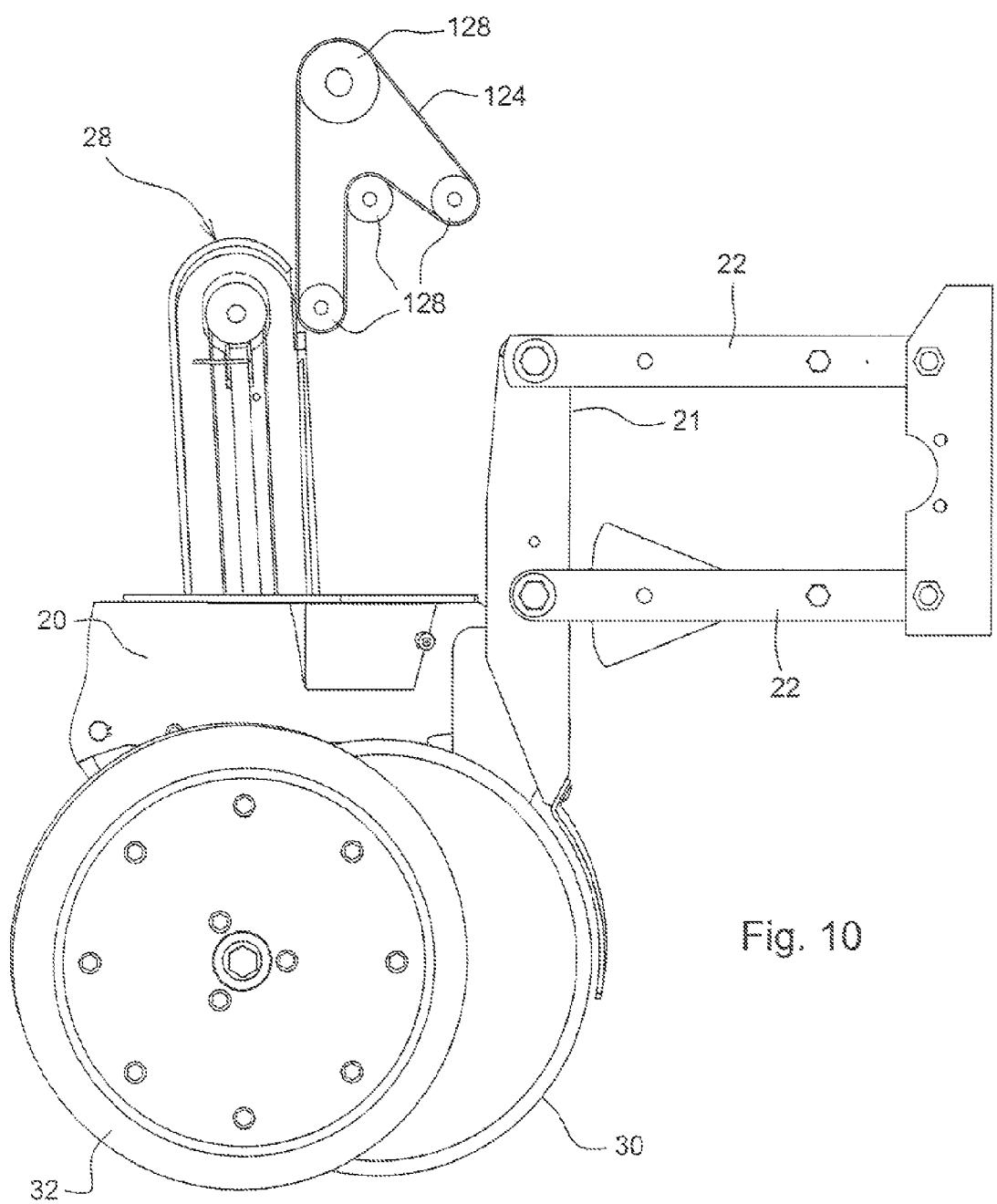
FIG. 10 is a side view of another orientation of the seed delivery system of the invention with a vacuum belt seed meter.

Another arrangement of the delivery system together with a vacuum meter belt is shown in FIG. 10. The delivery system 28 is in-line with the belt meter 124. This allows the distal ends of the brush bristles to sweep over the surface of the metering belt 126 to capture the seed therefrom. The meter belt 126 is wrapped around pulleys 128. The metering belt 124 is similar and functions as the belt 302 mentioned above.

Figure 11:
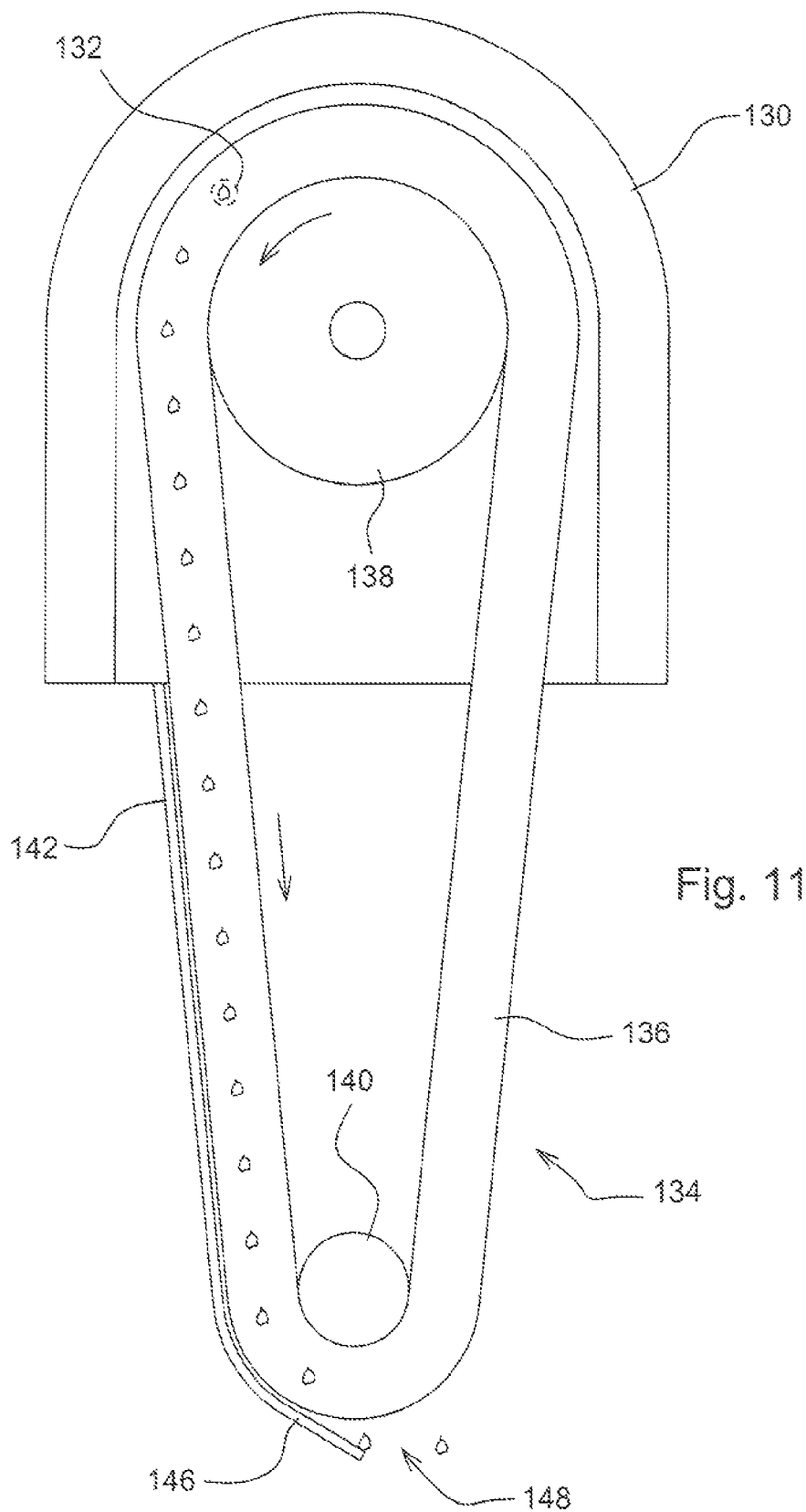
FIG. 11 is a side view illustrating the orientation of the seed delivery system of the invention with a finger pick-up meter.

The delivery system of the present invention can also be used with seed meters other than air pressure differential meters. For example, with reference to FIG. 11, a finger pick-up meter 130 is shown, such as that described in U.S. Pat. No. 3,552,601 and incorporated herein by reference. Seed is ejected from the meter through an opening 132. The delivery system 134 has a brush belt 136 wrapped about pulleys 138 and 140. As shown, the belt pulley 138 shares a common drive shaft with finger pick-up meter 130. A hub transmission such as a spherical continuously variable transmission or a three speed hub can be used to drive the belt 136 at a different speed from the meter 130. The delivery system housing includes a side wall 142. A ramp 146 is formed at the lower end of the wall 142 adjacent the lower opening 148. At the upper end of the delivery system, the upper opening is formed in the housing rear wall adjacent the opening 132 through which seeds are ejected from the seed meter. The seeds are inserted laterally into the brush bristles in a complete cross-feed. As in the other embodiments, the seed is captured in the brush bristles, moved downward to the lower opening, accelerated rearward and discharged through the lower opening 148.

The endless member of the delivery system has been described as being a brush belt with bristles. In a broad sense, the bristles form an outer periphery of contiguous disjoint surfaces that engage and grip the seed. While brush bristles are the preferred embodiment, and may be natural or synthetic, other material types can be used to grip the seed such as a foam pad, expanded foam pad, mesh pad or fiber pad.

Having described the preferred embodiment, it will become apparent that various modifications can be made without departing from the scope of the invention as defined in the accompanying claims.

The invention claimed is:

1. A seed delivery apparatus comprising:
   an elongated housing having a first opening through which seed is received into the seed delivery apparatus, a second opening through which seed exits the seed delivery apparatus, and an elongated interior chamber along which seed is conveyed from the first opening to the second opening; and
   an endless member positioned within the elongated housing, the endless member movable within the elongated interior chamber of the elongated housing to receive seed from the first opening and convey seed to the second opening, the endless member shaped to maintain contact with a top of each seed conveyed by the endless member along the elongated interior chamber between the first and second openings of the elongated housing.

2. The seed delivery apparatus of claim 1, wherein the endless member is movable about at least two rotatable members.

3. The seed delivery apparatus of claim 1, wherein the endless member is elongated and moves seed along a path from a first elevation adjacent the first opening to a second elevation lower than the first elevation and adjacent the second opening.

4. The seed delivery apparatus of claim 3, wherein the path includes a substantially straight portion along which the seed remains stationary with respect to that portion of the endless member within which the seed is received.

5. The seed delivery apparatus of claim 3, wherein in at least a portion of the path, the endless member accelerates seed received therein.

6. The seed delivery apparatus of claim 1, wherein bristles of the endless member maintain contact with a top of each seed conveyed by the endless member.

7. The seed delivery apparatus of claim 1, wherein the endless member is also shaped to maintain contact with a bottom of each seed conveyed by the endless member along the elongated interior chamber between the first and second openings of the elongated housing.

8. A seed delivery apparatus comprising:
   an elongated housing having a first opening through which seed is received into the seed delivery apparatus, a second opening through which seed exits the seed delivery apparatus, and an elongated interior chamber along which seed is conveyed from the first opening to the second opening; and
   an endless member positioned within the elongated housing, the endless member shaped and positioned to receive seed from the first opening, the endless member also movable to push the seed along the elongated interior chamber of the elongated housing toward the second opening.

9. The seed delivery apparatus of claim 8, wherein the endless member is movable about at least two rotatable members.

10. The seed delivery apparatus of claim 8, wherein the endless member is elongated and moves seed along a path from a first elevation adjacent the first opening to a second elevation lower than the first elevation and adjacent the second opening.

11. The seed delivery apparatus of claim 10, wherein the path includes a substantially straight portion along which the seed remains stationary with respect to that portion of the endless member within which the seed is received.

12. The seed delivery apparatus of claim 10, wherein in at least a portion of the path, the endless member accelerates seed received therein.

13. The seed delivery apparatus of claim 8, wherein bristles of the endless member push the seed along the elongated interior chamber of the elongated housing toward the second opening.

14. The seed delivery apparatus of claim 8, wherein the endless member is also shaped to push the seed out of the endless member and out of the second opening of the elongated housing.

15. A method of delivering a seed from a seed meter to a furrow, the method comprising:
   receiving the seed through a first opening defined in a housing;
   receiving the seed within an endless member in the housing at a first elevation;
   driving the endless member about at least two axes spaced apart from one another;

pushing the seed downward to a second elevation lower than the first elevation by driving the endless member;

discharging the seed from the endless member at the lower elevation; and discharging the seed from a second opening defined in the housing.

16. The method of claim 15, wherein driving the endless member comprises moving the endless member along a path having a substantially straight portion; the method further comprising maintaining the seed stationary with respect to that portion of the endless member within which the seed is received while moving through the substantially straight portion.

17. The method of claim 15, wherein pushing the seed downward comprises conveying the seed at a first velocity, the method further comprising accelerating the seed to a second velocity greater than the first velocity.

18. The method of claim 17, wherein accelerating the seed to the second velocity occurs immediately prior to discharging the seed from the endless member.

19. The method of claim 17, wherein accelerating the seed to the second velocity comprises moving the seed about one of the two axes.

20. The method of claim 15, wherein the endless member is a bristle belt.

* * * * *

(12) INTER PARTES REVIEW CERTIFICATE (2623rd)
United States Patent (10) Number: US 9,807,924 K1
Garner et al. (45) Certificate Issued: Feb. 25, 2022

(54) SEEDING MACHINE WITH SEED DELIVERY SYSTEM

(71) Applicants: Elijah B. Garner; Daniel B. Thiemke; David J. Rylander; Nathan A. Mariman; Michael E. Friestad

(72) Inventors: Elijah B. Garner; Daniel B. Thiemke; David J. Rylander; Nathan A. Mariman; Michael E. Friestad

(73) Assignee: DEERE & COMPANY

Trial Number:

IPR2019-01051 filed May 29, 2019

Inter Partes Review Certificate for:

Patent No.: 9,807,924
Issued: Nov. 7, 2017
Appl. No.: 14/704,568
Filed: May 5, 2015

The results of IPR2019-01051 are reflected in this inter partes review certificate under 35 U.S.C. 318(b).

INTER PARTES REVIEW CERTIFICATE
U.S. Patent 9,807,924 K1
Trial No. IPR2019-01051
Certificate Issued Feb. 25, 2022

AS A RESULT OF THE INTER PARTES REVIEW PROCEEDING, IT HAS BEEN DETERMINED THAT:

Claims 1-20 are found patentable.

* * * * *